US009582133B2

(12) United States Patent
Eichberger

(10) Patent No.: US 9,582,133 B2
(45) Date of Patent: Feb. 28, 2017

(54) FILE POSITION SHORTCUT AND WINDOW ARRANGEMENT

(71) Applicant: SAP SE, Walldorf (DE)

(72) Inventor: Gert Eichberger, Hassloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/673,519

(22) Filed: Nov. 9, 2012

(65) Prior Publication Data

US 2014/0137018 A1 May 15, 2014

(51) Int. Cl.
| | |
|---|---|
| *G06F 3/0486* | (2013.01) |
| *G06F 17/30* | (2006.01) |
| *G06F 3/0481* | (2013.01) |
| *G06F 17/21* | (2006.01) |

(52) U.S. Cl.
CPC .......... *G06F 3/0481* (2013.01); *G06F 3/0486* (2013.01); *G06F 17/21* (2013.01); *G06F 17/30876* (2013.01)

(58) Field of Classification Search
CPC ......................... G06F 17/30876; G06F 3/0486
See application file for complete search history.

(56) References Cited

U.S. PATENT DOCUMENTS

| | | | | | |
|---|---|---|---|---|---|
| 5,506,951 | A | * | 4/1996 | Ishikawa ........................ | 715/786 |
| 5,659,729 | A | * | 8/1997 | Nielsen | |
| 5,659,791 | A | * | 8/1997 | Nakajima et al. ............ | 715/202 |
| 5,687,334 | A | * | 11/1997 | Davis .................. | G06F 3/04895 |
| | | | | | 715/716 |
| 6,057,834 | A | * | 5/2000 | Pickover ....................... | 715/846 |
| 6,091,409 | A | * | 7/2000 | Dickman et al. ............. | 715/847 |
| 6,256,622 | B1 | * | 7/2001 | Howard et al. | |
| 6,377,286 | B1 | * | 4/2002 | Hochmuth .......... | G06F 3/04817 |
| | | | | | 715/810 |
| 8,042,036 | B1 | * | 10/2011 | Sharma et al. ............... | 715/208 |
| 8,856,827 | B1 | * | 10/2014 | Krause et al. .................. | 725/38 |

(Continued)

FOREIGN PATENT DOCUMENTS

| | | |
|---|---|---|
| JP | 2004-078888 A | 3/2004 |
| JP | 2005-149279 A | 6/2005 |

(Continued)

OTHER PUBLICATIONS

Basu, "Ditching Evernote? Check Out 5 Free Web Clipping Alternatives," Mar. 24, 2010, http://www.makeuseof.com/tag/ditching-evernote-check-5-free-web-clipping-alternatives/.*

(Continued)

*Primary Examiner* — Ryan Barrett
(74) *Attorney, Agent, or Firm* — Jones Day

(57) ABSTRACT

In response to an identification of a displayed position in a file, a shortcut to the identified position in the file may be created on a desktop environment. In response to an activation of the shortcut, the identified position in the file may be indicated. In response to the activation, the file may be opened. Identification of the position in the file may include dragging a cursor from the position in the file to a location on the desktop environment. Identification of the position in the file may include dragging a cursor from the position in the file to a toolbar and dragging the cursor from the toolbar to a location on the desktop environment.

17 Claims, 4 Drawing Sheets

(56) References Cited

U.S. PATENT DOCUMENTS

| | | | |
|---|---|---|---|
| 2001/0031454 A1* | 10/2001 | Mintz | G06Q 10/107 434/322 |
| 2003/0016241 A1* | 1/2003 | Burke | 345/733 |
| 2003/0074416 A1* | 4/2003 | Bates | G06F 17/30884 709/217 |
| 2004/0141013 A1* | 7/2004 | Alcazar et al. | 345/847 |
| 2004/0201630 A1* | 10/2004 | McInerney | 345/847 |
| 2004/0236774 A1* | 11/2004 | Baird et al. | 707/100 |
| 2005/0125413 A1* | 6/2005 | Wakabayashi | G06F 17/30905 |
| 2005/0149851 A1* | 7/2005 | Mittal | 715/501.1 |
| 2005/0154993 A1* | 7/2005 | Chen et al. | 715/770 |
| 2005/0210145 A1* | 9/2005 | Kim et al. | 709/231 |
| 2006/0075357 A1* | 4/2006 | Guido et al. | 715/784 |
| 2006/0212819 A1* | 9/2006 | Tobioka | G06F 3/04817 715/764 |
| 2007/0043839 A1* | 2/2007 | Amadio et al. | 709/222 |
| 2007/0044035 A1* | 2/2007 | Amadio et al. | 715/781 |
| 2007/0044039 A1* | 2/2007 | Amadio et al. | 715/847 |
| 2007/0128899 A1* | 6/2007 | Mayer | 439/152 |
| 2007/0157097 A1* | 7/2007 | Peters | G06F 3/04817 715/764 |
| 2007/0180407 A1* | 8/2007 | Vahtola | G06F 3/0489 715/847 |
| 2007/0226636 A1 | 9/2007 | Carpenter et al. | |
| 2007/0234209 A1* | 10/2007 | Williams | 715/700 |
| 2008/0005664 A1* | 1/2008 | Chandra | 715/513 |
| 2008/0005693 A1* | 1/2008 | Oliver | G06F 9/4443 715/781 |
| 2008/0028323 A1* | 1/2008 | Rosen et al. | 715/752 |
| 2008/0086688 A1* | 4/2008 | Chandratillake et al. | 715/719 |
| 2009/0006304 A1* | 1/2009 | Ma | G06F 17/30884 706/52 |
| 2009/0074235 A1* | 3/2009 | Lahr et al. | 382/100 |
| 2009/0183124 A1* | 7/2009 | Sridhar et al. | 715/847 |
| 2009/0187539 A1* | 7/2009 | Adams et al. | 707/3 |
| 2009/0187825 A1* | 7/2009 | Sandquist et al. | 715/719 |
| 2010/0107115 A1* | 4/2010 | Sareen | G06F 3/0481 715/783 |
| 2010/0141602 A1* | 6/2010 | Duchene | G05B 19/042 345/173 |
| 2010/0248788 A1 | 9/2010 | Yook et al. | |
| 2010/0303440 A1* | 12/2010 | Lin | H04N 5/76 386/241 |
| 2011/0047495 A1* | 2/2011 | Hendricks | 715/770 |
| 2011/0252374 A1* | 10/2011 | Chaudhri | G06F 3/04817 715/835 |
| 2011/0307883 A1* | 12/2011 | Hilerio et al. | 717/176 |
| 2012/0005572 A1* | 1/2012 | Rundle | 715/235 |
| 2012/0005596 A1 | 1/2012 | Carlson et al. | |
| 2012/0038792 A1* | 2/2012 | Nakase | G11B 27/329 348/231.2 |
| 2012/0047423 A1* | 2/2012 | Tomkow | 715/205 |
| 2012/0054169 A1* | 3/2012 | Marmaros et al. | 707/706 |
| 2012/0057848 A1* | 3/2012 | Casagrande | 386/245 |
| 2012/0079095 A1 | 3/2012 | Evans et al. | |
| 2012/0236201 A1* | 9/2012 | Larsen et al. | 348/468 |
| 2012/0240075 A1 | 9/2012 | Kim et al. | |
| 2012/0263430 A1* | 10/2012 | Spitzer-Williams | 386/224 |
| 2012/0274551 A1* | 11/2012 | Ishizuka et al. | 345/156 |
| 2012/0275764 A1* | 11/2012 | Eyer | 386/241 |
| 2013/0039634 A1* | 2/2013 | M | 386/230 |
| 2013/0094697 A1* | 4/2013 | Adcock et al. | 382/103 |
| 2013/0311885 A1* | 11/2013 | Wang et al. | 715/719 |
| 2014/0040273 A1* | 2/2014 | Cooper et al. | 707/741 |
| 2014/0282165 A1* | 9/2014 | Tu | G06F 3/04817 715/769 |

FOREIGN PATENT DOCUMENTS

| | | |
|---|---|---|
| JP | 2009-176231 A | 8/2009 |
| JP | 2012-123477 A | 6/2012 |
| WO | 03/096224 A1 | 11/2003 |
| WO | 2011/152335 A1 | 12/2011 |

OTHER PUBLICATIONS

Blatner, "Making Text Anchors the Fast Way," Sep. 2, 2009, http://indesignsecrets.com/making-text-anchors-the-fast-way.php.*

Basu, "How to Bookmark Movies to Resu Where You Left Off," Feb. 1, 2010, http://www.makeuseof.com/tag/bookmark-videos-resume-left/.*

Glazowski, "YouTube Lets You Get Picky With Video Timestamp Playback," Oct. 30, 2008, http://mashable.com/2008/10/30/youtube-deep-link-playback/.*

Burgess, "Make Windows Position Your Dual Monitors Correctly," Apr. 14, 2010, http://www.howtogeek.com/howto/14875/make-windows-position-your-dual-monitors-correctly/.*

European Search Report for EP 13189099.8 dated Feb. 6, 2014.

TeamWARE Office V5. 1 Installation Guide First Edition, Fujitsu Japan, Feb. 1998, First Edition, pp. 67-68. (English Abstract or translation not available).

Takahide Matsutsuka et al., An Architecture of Business Object Framework with Interface Oriented Paradigm, Proceedings of the 55th (1998 later stage) National Convention of Lecture, Japan, Information Processing Society of Japan, Sep. 24, 1997, (1), pp. 1-311-1-312. (English Abstract or translation not available).

* cited by examiner

200

300

FILE POSITION SHORTCUT AND WINDOW ARRANGEMENT

BACKGROUND

Users often access files on a computer device multiple times. For example, a user may draft a paper using a word processing application over a prolonged period. In the process of drafting the paper, the user may plan on adding more content to various paragraphs as the drafting progresses, and therefore, the user may need fast access to different portions of the paper at particular points in time.

Similarly, a user may access multiple files in order to combine content from those files. For example, a user may access a word processing file, a spreadsheet, and a presentation to combine content from all three files. Specifically, the user may need to access particular portions of each file which may contain related content. However, current desktop environments don't have mechanisms which allow a user to easily access a particular portion within a file efficiently.

DETAILED DESCRIPTION

Embodiments may be discussed in systems to efficiently access portions of files. In an embodiment, in response to an identification of a displayed position in a file, a shortcut to the identified position in the file may be created on a desktop environment. In response to an activation of the shortcut, the identified position in the file may be indicated. In an embodiment, in response to the activation, the file may be opened. In an embodiment, identification of the position in the file may include dragging a cursor from the position in the file to a location on the desktop environment. In an embodiment, identification of the position in the file may include dragging a cursor from the position in the file to a toolbar and dragging the cursor from the toolbar to a location on the desktop environment.

In an embodiment, in response to a selection and activation of shortcuts, an arrangement of application windows associated with the shortcuts may be determined. The determined arrangement may mirror an arrangement of the shortcuts. The application windows may be displayed on the desktop environment based on the determined arrangement. In an embodiment, the determined arrangement may utilize a maximum available display space on the desktop environment.

Figure 1:
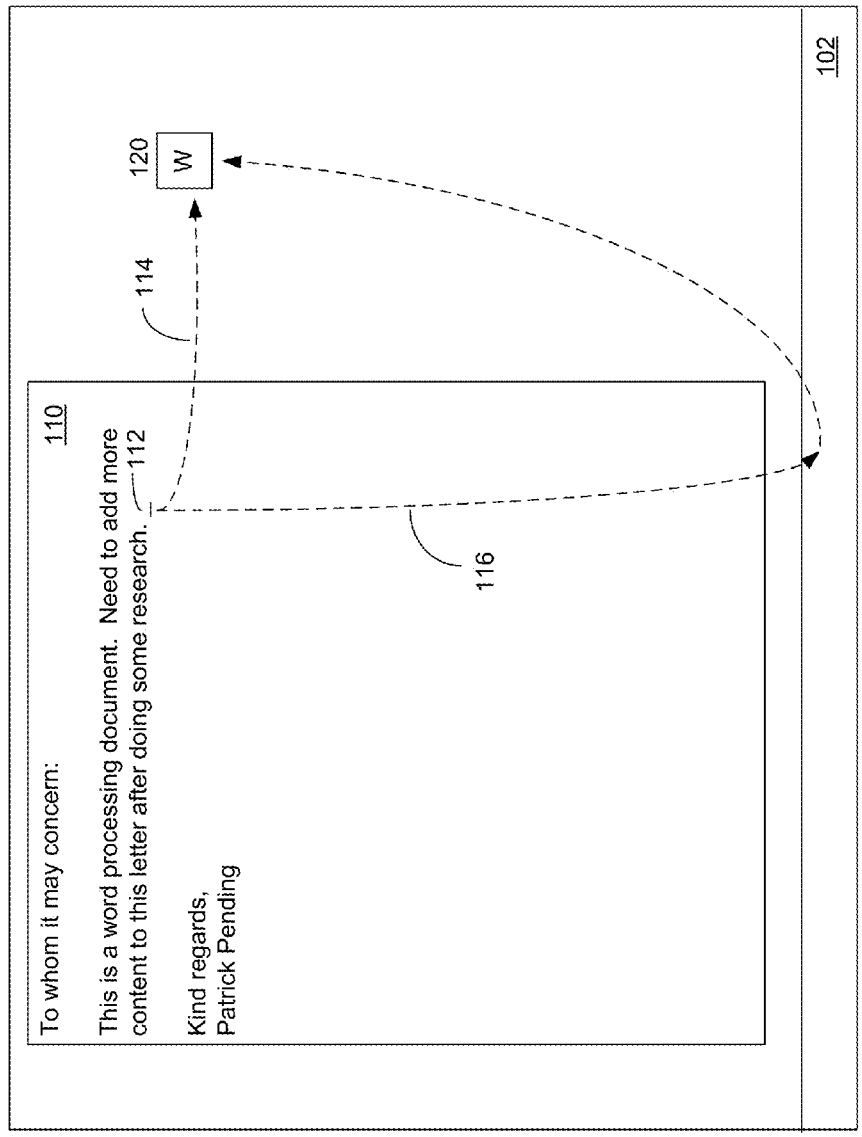
FIG. 1 illustrates the creation of a shortcut to a position in a file according to an embodiment.

FIG. 1 illustrates the creation of a shortcut to a position in a file according to an embodiment. In an embodiment, the shortcut 120 may be created via interactions with the graphical user interface (GUI) 100. The GUI 100 may be a desktop environment (DE) of an operating system. A user may interact with files through the DE 100 by, for example, opening, viewing, editing, listening to, saving, and/or closing the contents of a file. In an exemplary embodiment, a user may open file 110 to view/modify the contents of the file 110. The file 110 may be a word processing file, for example, a Microsoft® Word file. The user may then create a shortcut 120 on the DE 100 to a particular position 112 in file 110. When the shortcut 120 is created it may be associated with the position 112 in file 110. This association may be persistent even after the file 110 is closed. In an embodiment, the created shortcut 120 may be displayed so that it is always on the foreground of the GUI 100. Specifically, the shortcut 120 will always be visible (also known as "always on top") even if other windows are dragged over the shortcut 120.

In an embodiment, activating the shortcut 120 may indicate to the user the position 112 in the file 110. For example, double clicking on the shortcut 120 via a computer mouse may activate the shortcut 120. In response to activating the shortcut 120, a blinking cursor (i.e., the indicator) may be displayed at position 112. In an embodiment, if the file 110 is not open prior to the activation of the shortcut 120, activation of the shortcut 120 may first open the file 110 and then the position 112 may be indicated to the user. In an embodiment, after activation of the shortcut 120, input entered by the user to edit the file may modify the file starting at the position 112 indicated to the user.

A person having ordinary skill in the art will appreciate that the blinking cursor 112 is an example of an indicator, and that in other embodiments any visual indicator may be utilized. This may include varying the highlighting, shading, and/or visual depth at position 112, displaying a marker such as an arrow over position 112, etc.

Various actions may be used to create the shortcut 120. In an embodiment, the user may point a mouse pointer at position 112, click a button on the mouse, drag the mouse pointer to a desired shortcut creation location on the DE 100 while still holding the mouse button and then release the button at the desired shortcut creation location (the dashed line 114 illustrates the motion of the mouse pointer). Sometimes, the DE 100 may be overlaid by one or more displayed windows, and therefore, a location on DE 100 may not be easily accessible when the user tries to create the shortcut 120. Thus, in another embodiment, the user may point the mouse pointer at position 112, click a button on the mouse, drag the mouse pointer to a location such as the toolbar 102 while holding down the mouse button, continue dragging the mouse pointer to the desired shortcut creation location on the DE 100 while still holding the mouse button and then release the button at the desired shortcut creation location (the dashed line 116 illustrates the path of the mouse pointer). The dragging of the mouse to the toolbar 102 first may signal to the computer system that the shortcut should be placed on the DE 100 and not on one of the windows overlaid on DE 100. In an embodiment, responsive to dragging of the mouse pointer to the toolbar 102 in the process of creating the shortcut 120, the windows overlaid on GUI 100 may become translucent or transparent so that the user can better view the GUI 100 when deciding where to place the shortcut 120. In an embodiment, the shortcut 120 may be created via menus such as a right-click menu. The user may, for example, point the mouse pointer at position 112, click a button on the mouse, drag the mouse pointer to a desired shortcut creation location on the DE 100 while still holding the mouse button and then release the button at the desired shortcut creation location. In response to this action by the user, a menu may be displayed to the user which includes an option to create a shortcut.

Figure 2:
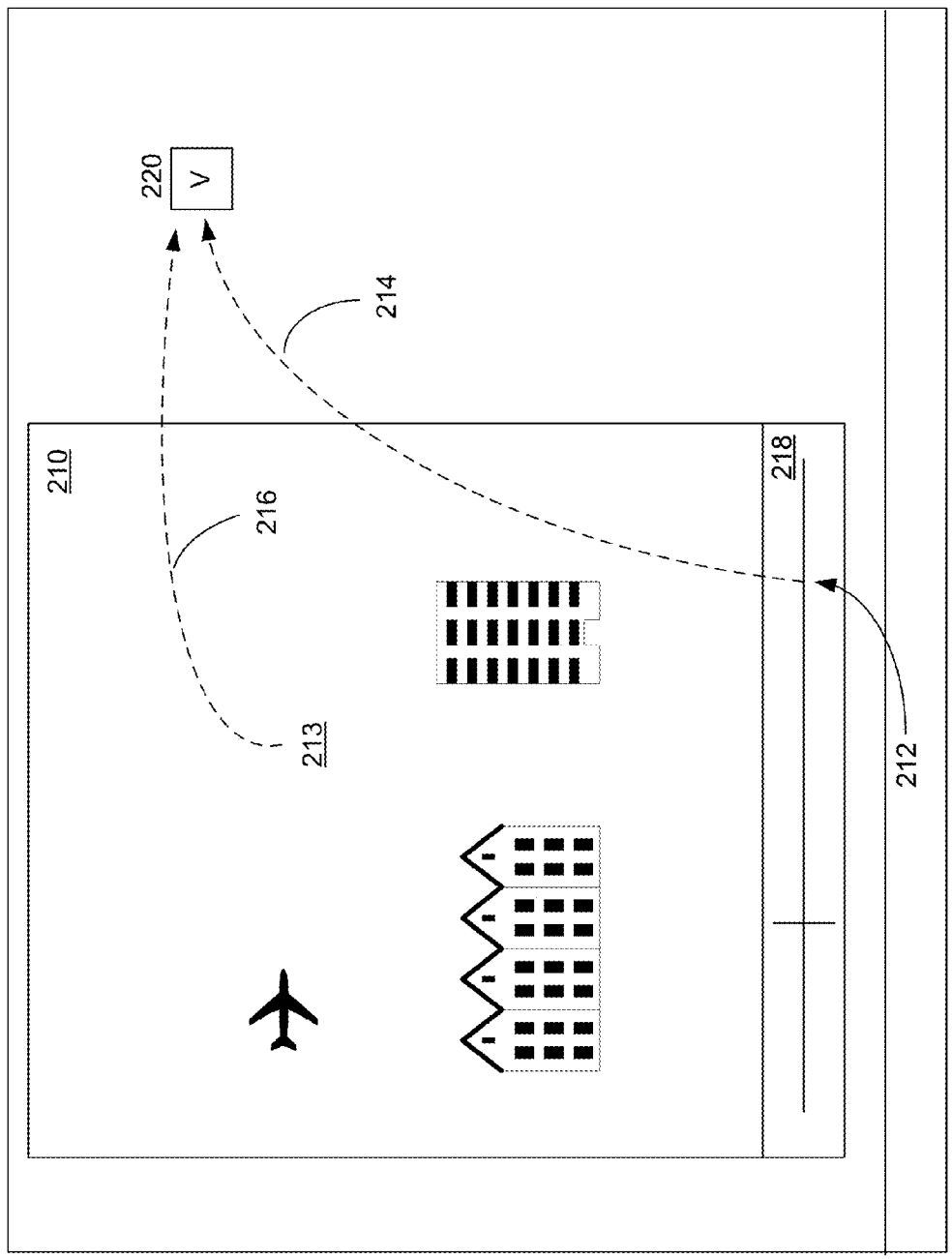
FIG. 2 illustrates the creation of a shortcut to a position in a video file according to an embodiment.

Shortcuts may be created to positions in any type of file including word processing files, spreadsheet files (such as Microsoft® Excel files), presentation files (such as Microsoft® Powerpoint files), diagram files (such as Microsoft® Visio files), e-mail files, files accessible via web browsers, audio files, and video files. FIG. 2 illustrates the creation of a shortcut to a position in a video file according to an embodiment. A video file 210 may be opened in a video player presented on GUI 100. Using the principles discussed above, a shortcut 220 may be created to a position in the video by clicking on a position 212 in the video's timeline 218 and dragging the mouse pointer to a location on the GUI 100. The dashed line 214 illustrates the motion of the mouse pointer. Activating the shortcut 220 may play the video 210 starting from a video frame corresponding to the position 212 in the video's timeline. In another embodiment, clicking on any location 213 in the currently playing video frame and dragging the mouse pointer to a location on the GUI 100 may create a shortcut 220 to a position in the video file 210 corresponding to the currently playing video frame. The dashed line 216 illustrates the motion of the mouse pointer.

The granularity of a position corresponding to a shortcut such as 120 and 220 may be customizable. For example, in an embodiment, user preferences may be set to create shortcuts to word processing files at a paragraph level. Therefore, if a shortcut is created by clicking and dragging a position in the middle of a paragraph, activating the shortcut may place a blinking cursor (i.e., the indicator) at the beginning of the paragraph instead of at the middle of the paragraph. In another embodiment, user preferences may be set to create shortcuts to word processing files at a letter level. Therefore, if a shortcut is created by clicking and dragging a position corresponding to the third letter of a particular word in a paragraph, activating the shortcut may place a blinking cursor (i.e., the indicator) at exactly the third letter of that particular word.

In an embodiment, a description of the shortcut may be displayed adjacent to the shortcut. The description may be automatically generated upon creation of the shortcut or may be supplied manually by the user. An automatically generated description may include an indication of the name of the file associated with the shortcut and/or an indication of the position associated with the shortcut.

Figure 3:
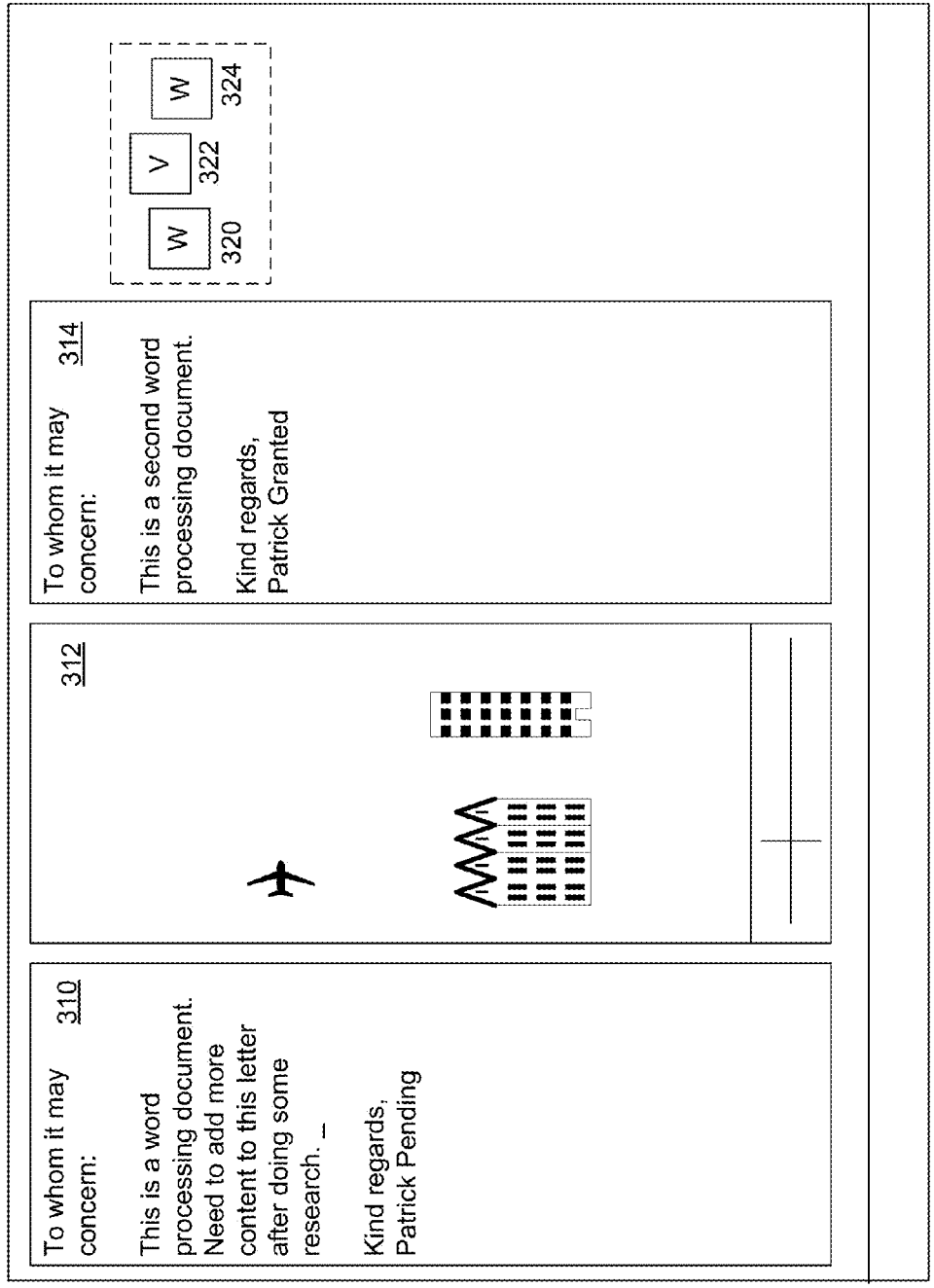
FIG. 3 illustrates the presentation of application windows based on the arrangement of shortcuts according to an embodiment.

FIG. 3 illustrates the presentation of application windows based on the arrangement of shortcuts according to an embodiment. Often, a user may access multiple files by manually arranging the windows displaying the files such that all windows are viewable on the GUI at the same time. For example, as illustrated in FIG. 3, a user may arrange windows 310, 312, and 314 adjacent to each other on GUI 300 so that the user may access all three windows at the same time. In addition, the user may arrange the windows 310, 312, and 314 in a particular pattern based on the user's preference. However, when the user closes one or more of the windows 310, 312, and 314, and re-opens them, the user may have to re-arrange the windows again based on the user's preference. In an embodiment, the arrangement of windows 310, 312, and 314 may be based on the arrangement of the shortcuts associated with the files displayed in those windows. For example, shortcuts 320, 322, and 324 may be associated with the files displayed in windows 310, 312, and 314 respectively. In an embodiment, the user may arrange shortcuts 320, 322, and 324 in approximately the same arrangement which the user prefers the corresponding file windows. For example, the user may prefer window 310 to be placed on the left side of the GUI 300, window 312 to be placed in the middle of the GUI 300, and window 314 to be placed on the right side of the GUI 300. Therefore, the user may arrange the shortcuts 320, 322, and 324 in a similar manner, i.e., shortcut 320 may be placed on the left, shortcut 322 may be placed in the middle, and shortcut 324 may be placed on the right as illustrated in FIG. 3. In response to selecting and activating all three shortcuts 320, 322, and 324, the files associated with the shortcuts may be opened in windows 310, 312, and 314 (if the files are not already open), and the windows 310, 312, and 314 may be automatically arranged on GUI 300 to mirror the arrangement of shortcuts 320, 322, and 324 as shown in FIG. 3. In an embodiment, when the shortcuts are selected and activated, the corresponding windows' dimensions may be adjusted so that the windows occupy approximately equal areas on GUI 300. In an embodiment, the windows' dimensions may adjusted so that the entire display area available on GUI 300 is utilized by the windows.

The shortcuts may be selected and/or activated in response to various actions performed by a user. Actions to select multiple icons in a DE such as individually clicking on each icon while holding down a particular keyboard button (for example, the "ctrl" button), dragging a box around the icons using the mouse, etc., are known in the art, and any of these selecting actions may be utilized to select the shortcuts. Similarly, actions to activate multiple selected icons in a DE such as right-clicking on multiple selected icons to open a menu and selecting the "open" command from the menu are known in the art, and any of these activating actions may be utilized to activate the shortcuts. In an embodiment, the selection of multiple shortcuts may automatically activate the selected shortcuts without requiring additional actions for the activation.

A person having ordinary skill in the art will appreciate that the arrangement of shortcuts and windows shown in FIG. 3 is illustrative and many other arrangements are possible in other embodiments. In addition, each shortcut shown in FIG. 3 may be any type of shortcut as long as the activation of the shortcut results in the opening of a window in GUI 300. For example, in an embodiment, each shortcut may be associated with a file and a position in the file as explained in the discussions pertaining to FIGS. 1 and 2. In another embodiment, the shortcut may be associated with just a file (without any position information). In a further embodiment, the shortcut may be associated with an application (without any information about files or positions within files) such as a shortcut which launches an application.

The principles discussed in this application are applicable to any device with a DE including desktop computers, laptop computers, tablet devices, mobile phones, smart phones, automobile computers with a graphical interface, video game devices, e-readers, and entertainment devices such as televisions and media players. In the foregoing discussion, although user actions for creating, selecting, and activating shortcuts have been described in the context of input devices such as a computer mouse and keyboard for clarity purposes, any other input device may be used to perform the same user actions depending on the device receiving the input. For example, if the user is interacting with a smart phone having a touchscreen, the user may create a shortcut by, for example, double tapping his/her finger on a particular position within a file, dragging the finger while maintaining contact with the touchscreen, and then removing the finger from the touchscreen when the desired location on the DE of the smart phone is reached. Analogous actions may be performed using input devices such as a stylus, trackball, pointing stick, remote control device, video game controller, motion sensors (for example, Microsoft®'s Kinect sensor), etc.

Figure 4:
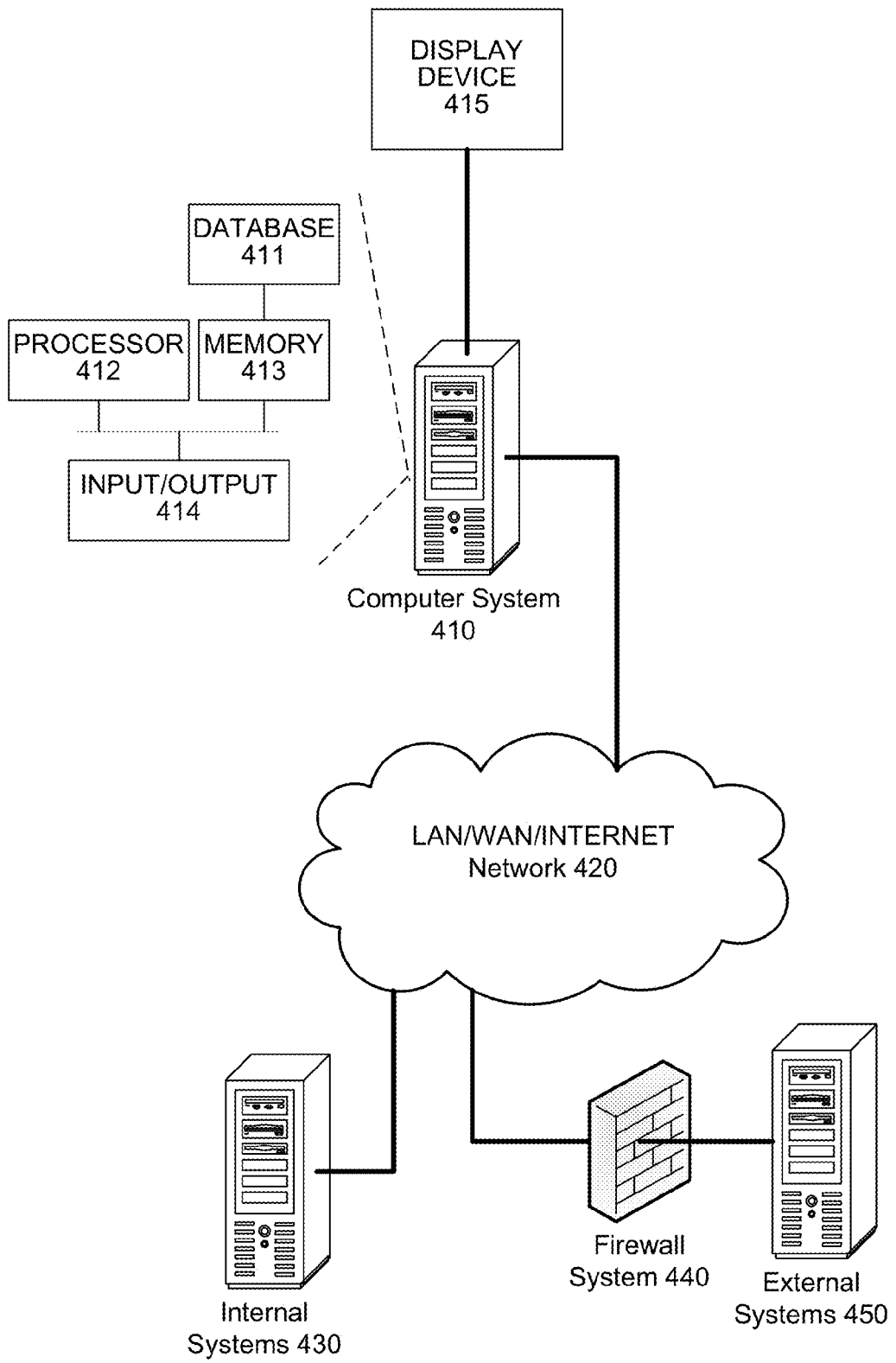
FIG. 4 shows an exemplary architecture in an embodiment of the invention.

FIG. 4 shows an exemplary architecture in an embodiment of the invention. The system running an application to view, create, or modify files 410 may be coupled to a display device 415, existing internal systems 430 through a network 420 and to external systems 450 through the network 420 and firewall system 440. The system running an application to view, create, or modify files 410 may include a desktop computer, laptop computer, tablet PC, client computer, mobile phone, central computer in a vehicle, any device with a touch screen, and any other computer. The display device 415 may include a computer monitor, a touch screen, a tablet PC screen, a mobile phone screen, and any other displays. The existing internal systems 430 may include a server and may provide file data and/or other data. The external systems 450 may include a server and may be maintained by a third party, such as an information service provider, and may contain file data and/or other data, that may be updated by the third party on a periodic basis. The system running an application to view, create, or modify files 410 may interact with these external systems to obtain files/updates through a firewall system 440 separating the internal systems from the external systems.

A person having ordinary skill in the art will appreciate that while internal systems 430 and external systems 450 are included in FIG. 4, in some embodiments, one or both of these systems may not be required. In an embodiment, the functionality provided by the internal systems 430 and external systems 450 may be provided by the system running the application to view, create, or modify files 410.

Each of the systems in FIG. 4 may contain a processing device 412, memory 413, a database 411, and an input/output interface 414, all of which may be interconnected via a system bus. In various embodiments, each of the systems 410, 430, 440, and 450 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 413 may contain different components for retrieving, presenting, changing, and saving data. Memory 413 may include a variety of memory devices, for example, Dynamic Random Access Memory (DRAM), Static RAM (SRAM), flash memory, cache memory, and other memory devices. Additionally, for example, memory 413 and processing device(s) 412 may be distributed across several different computers that collectively comprise a system.

Database 411 may include any type of data storage adapted to searching and retrieval. The database 411 may include SAP database (SAP DB), Informix, Oracle, DB2, Sybase, and other such database systems. The database 411 may include SAP's HANA (high performance analytic appliance) in-memory computing engine and other such in-memory databases.

Processing device 412 may perform computation and control functions of a system and comprises a suitable central processing unit (CPU). Processing device 412 may comprise a single integrated circuit, such as a microprocessing device, or may comprise any suitable number of integrated circuit devices and/or circuit boards working in cooperation to accomplish the functions of a processing device. Processing device 412 may execute computer programs, such as object-oriented computer programs, within memory 413.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

I claim:

1. A computer-implemented method comprising:
in response to an identification of a displayed position of a cursor in a first software file, creating, on a desktop environment, a first shortcut to the identified position of the cursor in the first software file, wherein the identification of the position of the cursor in the first software file includes dragging the cursor from the position in the first software file to a first location on the desktop environment;
in response to an identification of a displayed position of the cursor in a second software file, creating, on a desktop environment, a second shortcut to the identified position of the cursor in the second software file, wherein the identification of the position of the cursor in the second software file includes dragging the cursor from the position in the second software file to a second location on the desktop environment; and
in response to an activation of the first and second shortcuts:
determining an arrangement of a plurality of application windows associated with the first and second software files, wherein the determined arrangement mirrors an arrangement of the first and second shortcuts,
opening the first and second software files such that their corresponding application windows are positioned within the desktop environment based on the determined arrangement, and
indicating the respective identified position of the cursor in the respective first and second software files wherein upon creation of the first and second shortcuts, a respective first and second description is generated which includes a name of the respective first and second software file and a respective indication of the identified position of the cursor of the respective first and second shortcut, wherein contents of the respective first and second software files are modifiable at the respective identified positions of the cursor.

2. The method of claim 1, wherein the determined arrangement utilizes a maximum available display space on the desktop environment.

3. The method of claim 1, wherein the files comprise word processing files.

4. The method of claim 1, wherein the files comprise video files.

5. The method of claim 1, wherein the files comprise spreadsheet files.

6. The method of claim 1, wherein the files comprise presentation files.

7. The method of claim 1, wherein the files comprise diagram files.

8. The method of claim 1, wherein the files comprise electronic mail files.

9. The method of claim 1, wherein the files comprise audio files.

10. An apparatus comprising:
a processor to:
in response to an identification of a displayed position of a cursor in each of a plurality of files, create, on a desktop environment, a respective shortcut to the identified position in the file; and
in response to an activation of the shortcuts:
determine an arrangement of a plurality of application windows associated with the plurality of files, wherein the determined arrangement mirrors an arrangement of the plurality of shortcuts on the desktop environment;
open the plurality files such that their corresponding application windows are positioned within the desktop environment based on the determined arrangement, and
indicate the identified position of the cursor in the file, wherein contents of the file are modifiable at the identified position.

11. The apparatus of claim 10, wherein the identification of the position in the file includes:
dragging the cursor form the position in the file to a location on the desktop environment.

12. The apparatus of claim 10, wherein the identification of the position in the file includes:
first dragging the cursor from the position in the file to a toolbar while depressing a button on an input device, and
second dragging the cursor from the toolbar to a location on the desktop environment while continuing the depress the button on an input device without interruption after the first dragging.

13. The apparatus of claim 10, wherein the determined arrangement utilizes a maximum available display space on the desktop environment.

14. A non-transitory computer-readable medium embodied with computer-executable instructions for causing a computer to execute instructions, the computer instructions comprising:
in response to an identification of a displayed position of a cursor in each of a plurality of files, create, on a desktop environment, a respective shortcut to the identified position in the file; and
in response to an activation of the shortcuts:
determine an arrangement of a plurality of application windows associated with the plurality of files, wherein the determined arrangement mirrors an arrangement of the plurality of shortcuts on the desktop environment;
open the plurality files such that their corresponding application windows are positioned within the desktop environment based on the determined arrangement, and
indicate the identified position of the cursor in the file, wherein contents of the file are modifiable at the identified position.

15. The computer-readable medium of claim 14, wherein the identification of the position in the file includes:
dragging the cursor from the position in the file to a location on the desktop environment.

16. The computer-readable medium of claim 14, wherein the identification of the position in the file includes:
first dragging the cursor from the position in the file to a toolbar while depressing a button on an input device, and
second dragging the cursor from the toolbar to a location on the desktop environment while continuing the depress the button on an input device without interruption after the first dragging.

17. The computer-readable medium of claim 14, wherein the determined arrangement utilizes a maximum available display space on the desktop environment.

* * * * *